United States Patent

[11] 3,633,516

[72] Inventor Cletus Ray Henslee
  416 North Auglin Street, Cleburne, Tex. 76031
[21] Appl. No. 9,470
[22] Filed Feb. 10, 1970
[45] Patented Jan. 11, 1972
  Continuation-in-part of application Ser. No. 811,957, Apr. 4, 1969, now abandoned. This application Feb. 10, 1970, Ser. No. 9,470

[54] MOVABLE STAKE POCKETS
  14 Claims, 17 Drawing Figs.
[52] U.S. Cl. ................................................ 105/390, 105/381, 280/144, 296/43
[51] Int. Cl. ................................................ B61d 3/08
[50] Field of Search .................................. 105/380, 381, 387, 390, 391; 296/43; 280/144

[56] References Cited
UNITED STATES PATENTS

| | | | |
|---|---|---|---|
| 3,225,708 | 12/1965 | Holman | 105/380 |
| 943,495 | 12/1909 | Warren | 280/144 |
| 3,542,264 | 11/1970 | Meyer et al. | 105/387 |
| 907,183 | 12/1908 | Seaman | 105/390 |
| 790,915 | 5/1905 | Parsons | 280/144 |

Primary Examiner—Arthur L. La Point
Assistant Examiner—Richard A. Bertsch
Attorneys—Clarence A. O'Brien and Harvey B. Jacobson ABSTRACT: A load bed of a vehicle including opposite side sets of longitudinally spaced, elongated and transversely extending upwardly opening recesses each having a support structure disposed therein for adjustable positioning along the corresponding recess. The recesses and support structures include a coacting structure operable to prevent movement of the support structures in their recesses toward the corresponding side of the vehicle after the support structures have been placed in predetermined positions along the corresponding recesses. Further, the support structures have either permanently supported, detachable or swingable load retaining stakes supported therefrom and the swingable stakes are swingable to horizontally disposed retracted positions wholly received within the corresponding recesses when the associated support structures are disposed in the ends of the recesses adjacent the sides of the load bed. Further, all but one form of the support structures disclosed are supported within the corresponding recesses against removal therefrom and all forms of the disclosed support structures are fully recessed within the corresponding recesses.

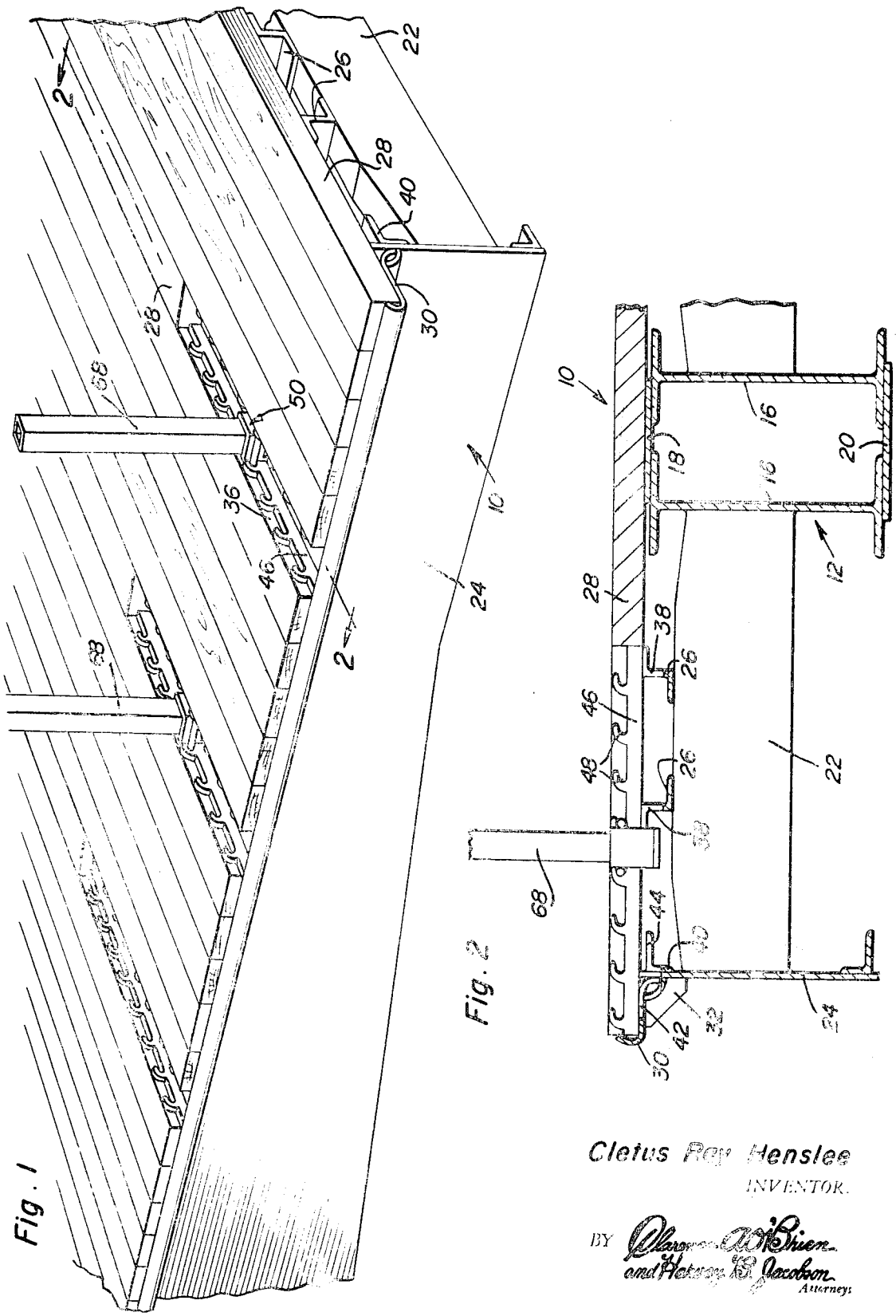

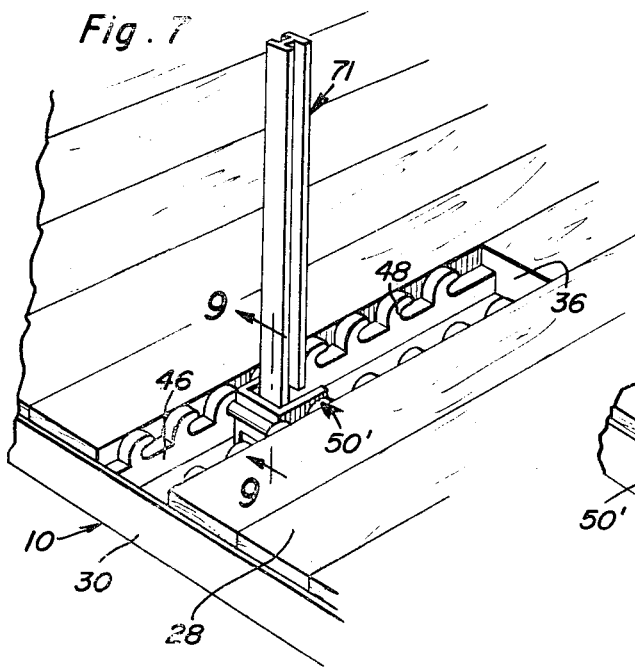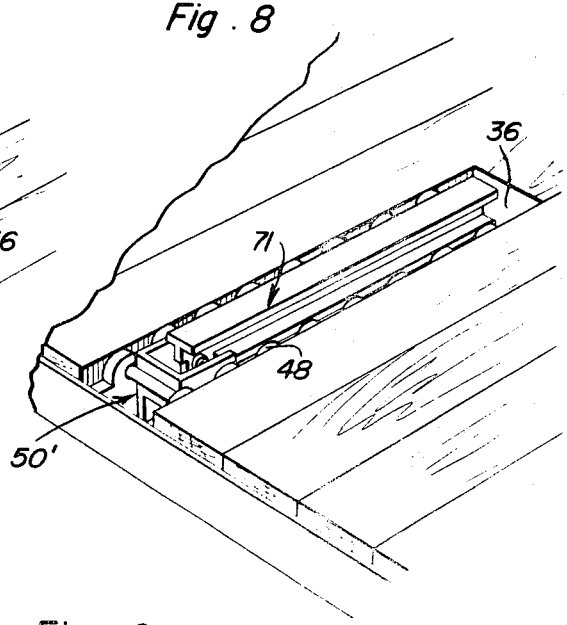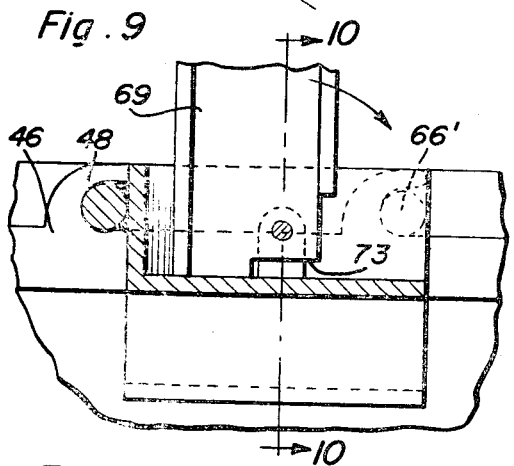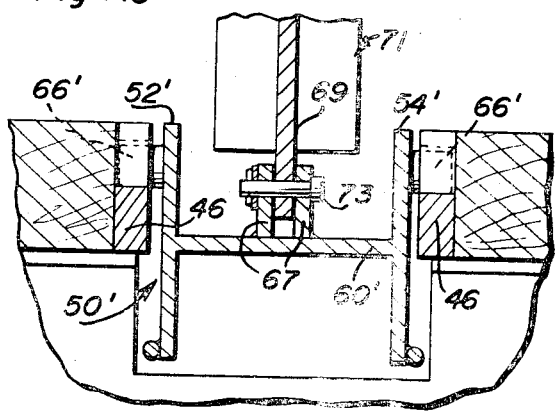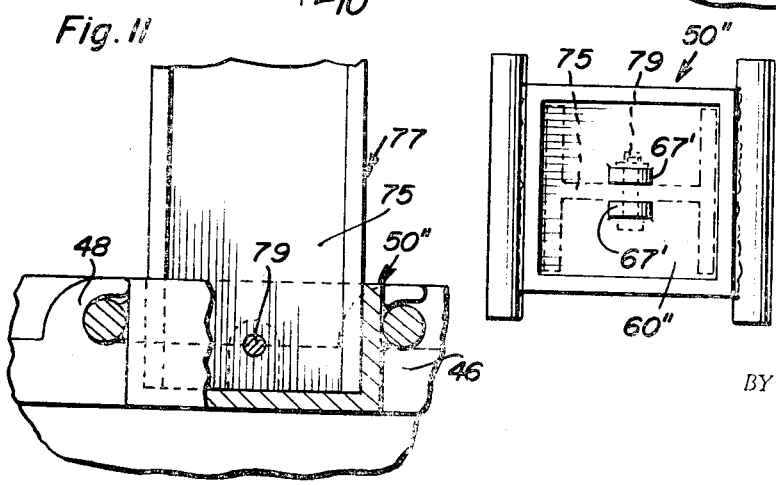

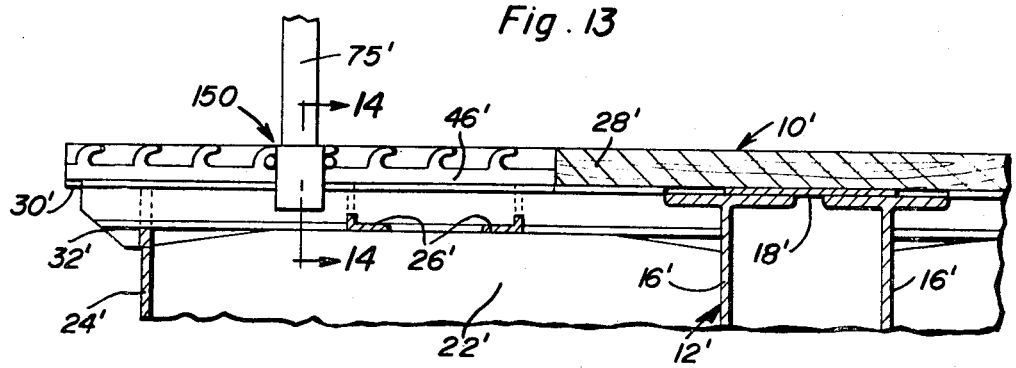
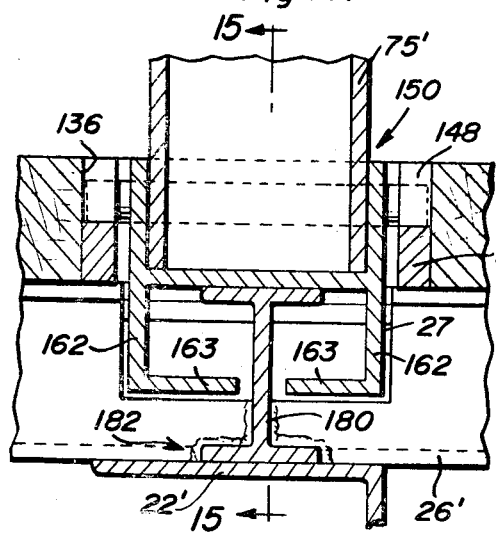
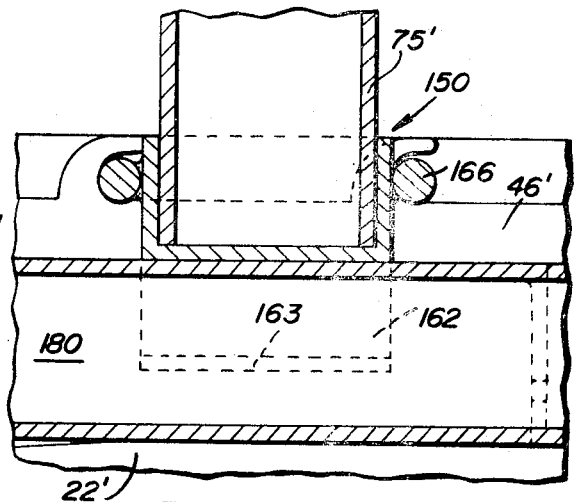
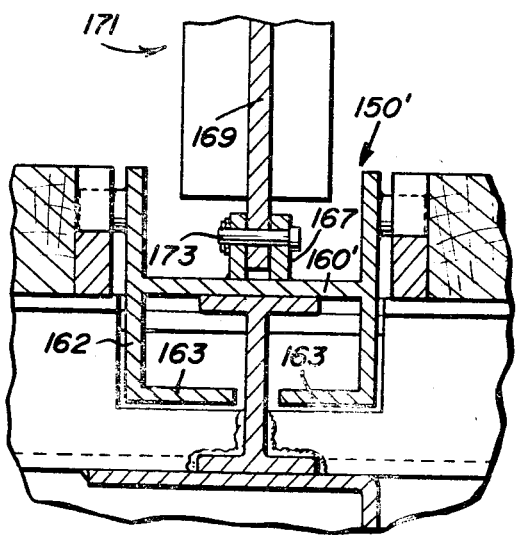
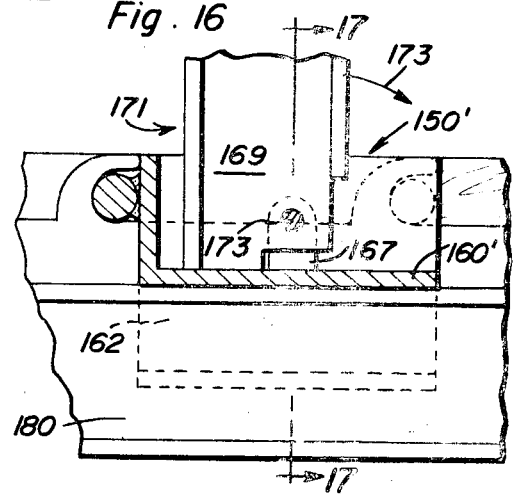
Cletus Ray Henslee
INVENTOR.

MOVABLE STAKE POCKETS

This application comprises a continuation-in-part of my copending application Ser. No. 811,957, filed Apr. 4, 1961, for moveable stake pockets (now abandoned).

This invention relates to movable stake pockets utilized on a flat load bed such as the load bed of railway cars. However, the stake pockets may also be utilized on other types of load beds such as road vehicle load beds and barge or ship load beds, etc.

The main object of this invention is to provide a simple, yet highly effective, movable stake pocket which may be readily applied to new and existing load beds of various vehicles for the purpose of providing load retaining stakes, when desired.

Still another object of this invention is to provide movable stake pockets which may be readily shifted transversely of the associated load bed so as to define load retaining areas of different widths.

Another object of this invention is to provide a strong and yet adjustable stake construction to be applied against a packaged, banded or container load to prevent load shifts.

A final object of this invention to be specifically enumerated herein is to provide a load retaining stake pocket assembly for use on a load bed and which will be adjustable transversely of the load bed with the pocket assembly conforming to conventional forms of manufacture, being of simple construction and easy to use so as to provide a device that will be economically feasible, long lasting and relatively trouble free.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a fragmentary perspective view of the load bed portion of a railway flat car in which the movable stake pocket assembly of the instant invention has been incorporated;

FIG. 2 is a fragmentary enlarged vertical sectional view taken substantially upon the plane indicated by the section line 2—2 of FIG. 1;

FIG. 7 is a perspective view of a load bed in which a modified form of stake pocket assembly has been incorporated and which includes a pivotally retractable stake;

FIG. 8 is a perspective view similar to FIG. 7 but illustrating the stake of FIG. 7 in a collapsed or retracted position;

FIG. 9 is an enlarged fragmentary transverse vertical sectional view taken substantially upon the plane indicated by the section line 9—9 of FIG. 7;

FIG. 10 is a fragmentary longitudinal vertical sectional view taken substantially upon the plane indicated by the section 10—10 of FIG. 9;

FIG. 11 is a transverse vertical sectional view similar to FIG. 10 but illustrating a modified wholly removable pocket defining support structure;

FIG. 12 is a top plan view of the removable pocket defining support structure illustrated in FIG. 11;

FIG. 13 is a fragmentary transverse vertical sectional view similar to FIG. 2 but illustrating a third modified form of pocket defining support structure;

FIG. 14 is a fragmentary enlarged longitudinal vertical sectional view taken substantially upon the plane indicated by the section line 14—14 of FIG. 13;

FIG. 15 is a transverse vertical sectional view taken substantially upon the plane indicated by the section line 15—15 of FIG. 14;

FIG. 16 is a transverse vertical sectional view similar to FIG. 15 but illustrating a fourth form of pocket defining support structure from which a second form of pivotable stake is supported; and FIG. 17 is a fragmentary longitudinal vertical sectional view taken substantially upon the plane indicated by the section line 17—17 of FIG. 16.

Figure 3:
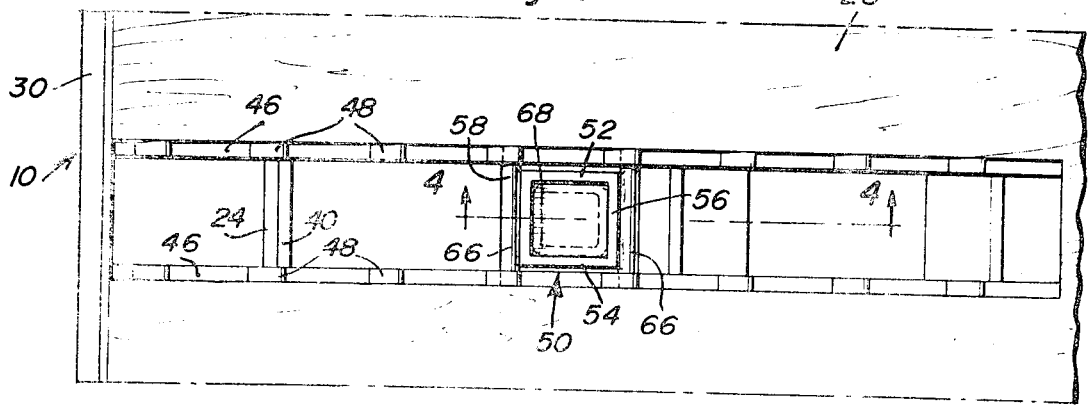
FIG. 3 is a fragmentary top plan view of the right hand stake pocket assembly illustrated in FIG. 1.
Figure 4:
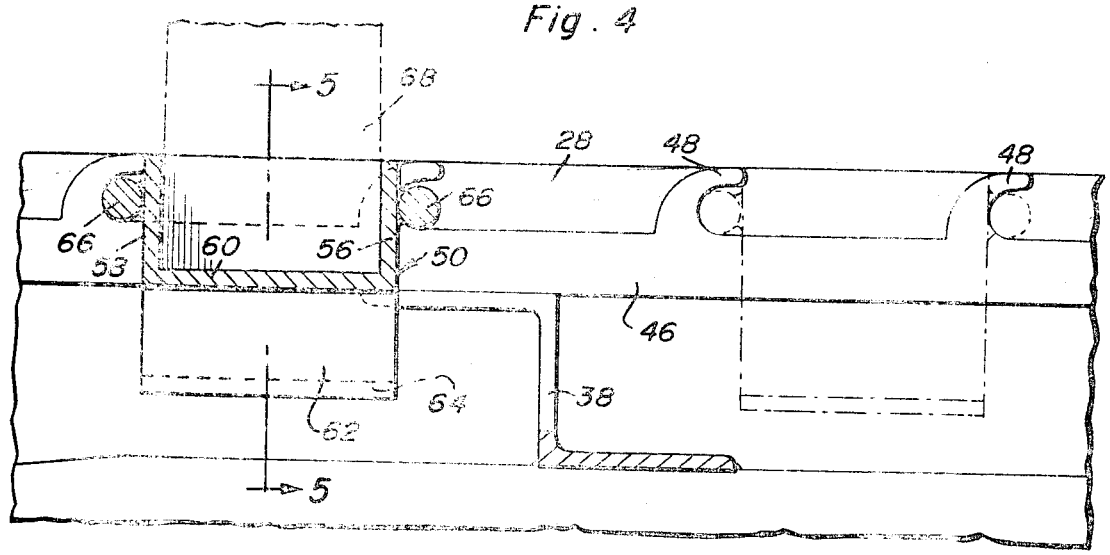
FIG. 4 is an enlarged fragmentary transverse vertical sectional view taken substantially upon the plane indicated by the section line 4—4 of FIG. 3.
Figure 5:
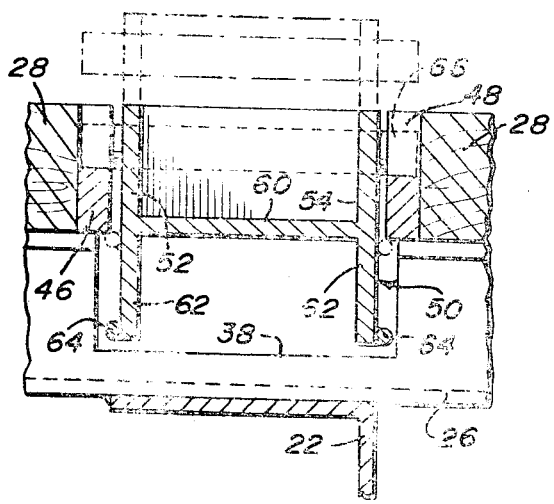
FIG. 5 is a fragmentary longitudinal sectional view taken substantially upon the plane indicated by the section line 5—5 of FIG. 5 and with an alternate raised position of the stake pocket defining support structure of the pocket assembly illustrated in phantom lines.

Referring now more specifically to the drawings the numeral 10 generally designates a railway flatcar which includes a main underframe assembly referred to in general by the reference numeral 12 comprised of two longitudinally extending, parallel I-beam members 16 joined along their upper and lower marginal edge portions by means of a tie plate 18 and transverse braces 20, respectively. A plurality of transversely extending and longitudinally spaced formed channel beams extend between opposite sides of the center sill assembly defined by the beams 16 and the corresponding side sills 24. A plurality of longitudinally extending and transversely spaced Z-type stringers 26 are secured to and extend across between corresponding upper marginal edge portions of the crossbeams 22 and transversely extending flooring planks 28 are secured across the stringers 26 and the center still defined by the beams 16.

With attention invited to FIG. 2 of the drawings it may be seen that one form of railway flatcar 10 includes a formed edge rail braced from the upper marginal edge portion of the side sill 24 by means of a plurality of longitudinally spaced gusset plates 32 and that the edge rail 30 embraces the lower portions of the corresponding ends of the flooring planks 28. With attention now invited more specifically to FIG. 13, it may be seen that a second form of railway car 10' includes frame components similar to the frame components of the car 10 and referred to by corresponding prime numerals. However, the car 10' includes longitudinally spaced gusset plates 32' which support longitudinally spaced portions of a corresponding edge plate 30'.

In practicing the present invention, and with attention first invited to FIGS. 1-6 of the drawings, certain longitudinally spaced flooring planks 28 are first removed so as to define transverse voids 36 extending transversely and spaced longitudinally of the flooring of the railway car 10. Then, the stringers 26 are notched as at 38 and other components such as the edge rail 30 and angle brace 40 secured to the inner side of the upper marginal portion of the side stringer 24 are notched as at 42 and 44, respectively. These various notches are aligned transversely of the car 10 and registered with the voids 36. Thereafter, a pair of spaced parallel support bars 46 each provided with upwardly projecting and longitudinally opening hook portions 48 are secured within the opposite ends of the voids 36 with the support bars 46 welded to the edge rail 30 and the stringers 26. The bars are secured within the opposite ends of the voids 36 with the hooks 48 opening inwardly toward the centerline of the car 10. However, before the second support bar 46 of each pair thereof is secured in place, a support structure referred to in general by the reference numeral 50 is placed between each pair of support bars 46. The support structure 50 defines an upwardly opening box structure including opposite end walls 52 and 54 interconnected by opposite side walls 56 and 58 and a bottom wall 60. Each of the end walls 52 and 54 includes a lower extension 62 and each extension has a horizontally disposed abutment rod 64 secured, as by welding, to the outer surface of its lower marginal edge portion. The outer surfaces of the end walls 52 and 54 are closely received between the confronting surfaces of each pair of support bars 46 and after the second support bar 46 of each pair has been secured in position, the opposing faces of each pair of support bars are spaced closer together than the remote surfaces of the corresponding rods 64 whereby the support assemblies or structures 50 are retained within the opposite ends of the voids 36, after the center portions of the previously removed flooring planks 28 are replaced to close the inner ends of the opposite side voids 36.

The support assemblies 50 each includes a pair of transverse abutment bars 66 which are secured to the outer surfaces of the side walls 56 and 58 adjacent the upper marginal edge portion thereof in any convenient manner such as by welding. When the support assemblies or structures 50 are received between corresponding support bars 46, the abutment bars 66 have their opposite ends resting upon the upper surfaces of the support bars 46 intermediate adjacent hooks 48. In addition, the end portions of the abutment bars 66 are seatingly receivable in the hooks 48 and it will be noted that the spacing between the abutment bars 66 corresponds to the spacing between adjacent hooks 48. Further, from FIG. 5 of the drawings, it may be seen that the support assemblies 50 may be raised sufficiently relative to the support bars 46 before the rods 64 contact the lower edge portions of the bars 46 to enable the end portions of the abutment bars 66 to pass over the upper ends of the hooks 48. Accordingly, when it is desired to shift either support assembly 50 to another position, that support assembly 50 is first shifted slightly toward the center of the car 10, then elevated to the upper limit position thereof illustrated in phantom lines in FIG. 5 of the drawings and thereafter shifted longitudinally of the corresponding support bars 46 to the new position desired before being again lowered into contact with the support bars 46 and the hooks 48 supported therefrom.

Figure 6:
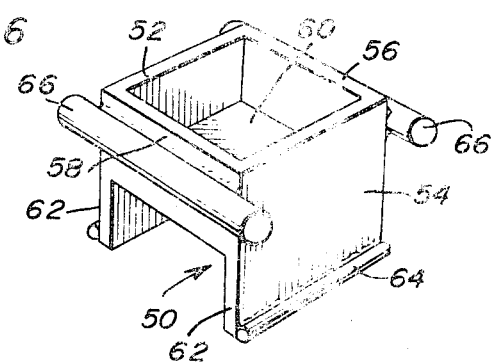
FIG. 6 is a perspective view of the stake pocket defining support structure utilized in FIGS. 1-5.

From FIG. 6 of the drawings it will be noted that each support assembly 50 defines a rectangular upwardly opening pocket in which the lower end of a rectangular stake such as that designated by the reference numeral 68 in FIGS. 1 through 4 of the drawings may be removably received.

Accordingly, the stakes 68 may be shifted transversely of the railway car 10 to the desired positions thereof. Also, the stakes 68 may be readily removed from the upwardly opening sockets defined by the corresponding support assemblies 50 so as to enable the full plan area of the flooring planks 28 to be utilized for supporting a load, if desired.

With attention now invited more specifically to FIGS. 7 through 10 of the drawings, there will be seen a modified form of support assembly referred to in general by the reference numeral 50' and which is substantially identical to the support assembly 50 except that a side wall corresponding to the sidewall 56 is omitted and the corresponding ends of the end walls 52' and 54' are extended and have abutment pins 66' secured to their outer surfaces. Otherwise, the bottom wall 60' is provided with a pair of upstanding longitudinally spaced apertured ears 67 between which the web portion 69 are of an I-beam referred to in general by the reference numeral 71 is secured by means of a removable fastener 73. Further, the web portion 69 of the I-beam 71 is notched as at 73 to enable the I-beam 71 to be swung from the upstanding stake defining position illustrated in FIG. 7 of the drawings to the fully collapsed and recessed position thereof illustrated in FIG. 8 of the drawings.

With attention now invited more specifically to FIGS. 11 and 12 of the drawings, there will be seen a third form of support assembly referred to in general by the reference numeral 50" and which is substantially identical to the support assembly 50 except that rods corresponding to rods 64 and extensions corresponding to extensions 62 are omitted from the support assembly 50". Further, the bottom wall 60" of the assembly 50" is provided with a pair of apertured ears 67' corresponding to the ears 67 and between which the lower end of the web portion 75 of an I-beam referred to in general by the reference numeral 77 is secured by means of a removable fastener 79. However, since the support assembly 50" is not provided with rods corresponding to rods 54, the support assemblies 50" may be readily removed from the support bars 46.

With attention now invited more specifically to FIGS. 11-15 of the drawings, there will be seen a fourth form of support assembly referred to in general by the reference numeral 150 and which is substantially identical to the support assembly 50 and has its corresponding parts designated by numerals in the 100 series corresponding to the numerals applied to the support assembly 50. The support assembly 150, instead of including the rods 164, includes inturned horizontal flange portions 163 carried by the lower ends of its extensions 162 and which include free edge portions closely spaced from opposite sides of the web portion 180 of an I-beam referred to in general by the reference numeral 182. Each I-beam 182 rests upon and is secured to the corresponding crossbeam 22' and each I-beam 182 is centered relative to the corresponding void 136. Further, each of the stringers 26' is notched out to receive each beam 180 therethrough and the stringers 26' are secured to the beams 180 by means of welding. Further, the stringers 26' are of course also notched out as at 27 to receive the extensions 162 and flanges 163 therethrough. Of course, the upper horizontal flange portion of the I-beam 182 limits upward movement of the support assembly 136 and thereby prevents removal but allows its adjustment longitudinally of the corresponding support bars 46'.

The support assemblies 150 are similar to the support assemblies 50" in that they receive the lower ends of upstanding tubular stakes 75' therein.

With attention now invited more specifically to FIGS. 16 and 17 of the drawings, there will be seen a support assembly generally referred to by the reference numeral 150' which is substantially identical to the support assembly 150 except that the inner end of each support assembly 150' is open and the bottom wall 160' thereof includes a pair of apertured mounting ears 167 corresponding to the mounting ears 67 and between which the web portion 169 of an I-beam 171 is secured by means of a removable pivot fastener 173. Accordingly, the I-beam stake 171 may be swung in the direction of the arrow 173 in FIG. 16 of the drawings for movement to a fully collapsed position such as the collapsed position of the stake 71 illustrated in FIG. 8 of the drawings.

Each of the support assemblies therefore defines an upwardly opening receptacle in which the lower end of an associated stake may be secured. Some of the stakes are merely downwardly telescoped into the corresponding support assemblies while other stakes are semipermanently secured in the support assemblies for removal from the associated railway car with the corresponding support assembly while still other stakes are pivotally supported from the corresponding support assemblies for swinging movement to fully recessed horizontal positions whereby the full load bed of the cart 10 may be utilized. Also, any notched portions of the stringers 26 and 26' may be suitably braced by the welding of reinforcing plates thereto, if desired.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination with a support assembly defining a support structure adapted to have a load supported thereon, said assembly defining an elongated recess having one longitudinal side thereof opening outwardly through said surface, opposite sides of said recess between which said one open side extends including longitudinally spaced pairs of rigid hook members recessed inwardly of said surface, projecting toward the latter and opening toward one end of said recess, and a socket assembly disposed in said recess and including pairs of opposite side outwardly projecting locating pins spaced longitudinally of said recess and simultaneously seatingly engageable with corresponding pairs of said hook members, said socket assembly defining a socket opening outwardly of said surface and in which the base end of a load retaining stake may be anchored, said socket assembly being guidingly supported from said support assembly for movement along said recess and shifting of said socket assembly in a path generally normal to said surface between an inner position with said pins positioned in registry with said hook members for seating therein upon movement of said socket member toward the other end of said recess and an outer position with said pins movable past said hooks outwardly of the latter.

2. The combination of claim 1 wherein said socket of said socket assembly also opens longitudinally of said recess, said socket assembly including means for pivotally securing the base end of a load retaining stake therein.

3. The combination of claim 1 wherein said support surface comprises the load supporting surface of an elongated load bed defined by said support assembly.

4. The combination of claim 3 wherein said load supporting surface includes a plurality of longitudinally spaced locations along both sides thereof, each of said locations having a recess formed therein with the various recesses extending transversely of the load supporting surface.

5. The combination of claim 4 wherein said elongated load bed comprises the load bed of a railway flatcar.

6. The combination of claim 1 wherein the said socket assembly and said support assembly include coacting means preventing complete withdrawal of said socket assembly outwardly of said open side of said recess.

7. The combination of claim 1 wherein said hook members are carried by and spaced longitudinally of a pair of elongated support bars supported from said support assembly and disposed in and extending along said opposite sides of said recess and from which said hook members project toward said surface.

8. The combination of claim 7 wherein said socket assembly includes oppositely outwardly projecting abutment portions engageable with undersurface portions of said bars for limiting outward withdrawal of said socket assembly from said recess.

9. The combination of claim 8 including an elongated stake having its lower end removably downwardly telescoped in said socket.

10. The combination of claim 8 wherein said socket of said socket assembly also opens longitudinally of said recess, said socket assembly including means for pivotally securing the base end of a load retaining stake therein.

11. The combination of claim 1 wherein said socket assembly includes centrally disposed means for removably locking the lower end of an upright stake therein, said socket including continuous peripheral walls being readily removably supported in said recess.

12. In combination with a support assembly defining a support surface adapted to have a load supported thereon, said assembly defining an elongated recess having one longitudinal side thereof opening outwardly through said surface, opposite sides of said recess between which said one open side extends including longitudinally spaced pairs of hook members opening toward one end of said recess, and a socket assembly disposed in said recess and including pairs of opposite side outwardly projecting locating pins spaced longitudinally of said recess and simultaneously seatingly engageable with corresponding pairs of said hook members, said socket assembly defining a socket opening outwardly of said surface and in which the base end of a load retaining stake may be anchored, said socket assembly including opposite side depending portions terminating downwardly in inturned portions whose free edges are spaced from each other, said support assembly including means disposed beneath said socket extending longitudinally of said recess with which said inturned portions are engageable to limit outward displacement of said socket assembly from said recess.

13. The combination of claim 12 including an elongated stake having its lower end removably downwardly telescoped in said socket.

14. The combination of claim 12 wherein said support surface comprises the load supporting surface of an elongated load bed defined by said support assembly.

* * * * *